United States Patent
Hanceanu et al.

(10) Patent No.: US 11,543,321 B2
(45) Date of Patent: Jan. 3, 2023

(54) METHODS AND APPARATUS FOR LEAK DETECTION FROM A THIEF HATCH

(71) Applicant: Emerson Process Management Regulator Technologies Tulsa, LLC, Tulsa, OK (US)

(72) Inventors: Vlad Cristinel Hanceanu, Apahida (RO); Istvan Bartha, Odorheiu-Secuiesc (RO); Silviu Vasile Rebreanu, Cluj-Napoca (RO); Cristian Amza, Cluj-Napoca (RO)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 260 days.

(21) Appl. No.: 16/855,810

(22) Filed: Apr. 22, 2020

(65) Prior Publication Data
US 2020/0340880 A1    Oct. 29, 2020

Related U.S. Application Data

(63) Continuation of application No. PCT/IB2019/000559, filed on Apr. 25, 2019.

(51) Int. Cl.
| | |
|---|---|
| *G01M 3/18* | (2006.01) |
| *B65D 90/10* | (2006.01) |
| *B65D 90/48* | (2006.01) |
| *G01M 3/32* | (2006.01) |

(52) U.S. Cl.
CPC ............. *G01M 3/186* (2013.01); *B65D 90/10* (2013.01); *B65D 90/48* (2013.01); *G01M 3/3209* (2013.01)

(58) Field of Classification Search
CPC .... G01M 3/186; G01M 3/3209; B65D 90/10; B65D 90/48
See application file for complete search history.

(56) References Cited

U.S. PATENT DOCUMENTS

| | | | |
|---|---|---|---|
| 9,145,904 B2* | 9/2015 | Griffin, Jr. ............. | G05D 16/16 |
| 2005/0056000 A1* | 3/2005 | Jansen .................... | F02C 7/232 |
| | | | 60/39.094 |
| 2009/0277374 A1 | 11/2009 | Schie et al. | |
| 2013/0264341 A1* | 10/2013 | Cockerham ............ | B65D 90/34 |
| | | | 220/203.29 |

OTHER PUBLICATIONS

International Searching Authority, "International Search Report," dated Feb. 3, 2020 in connection with International Patent Application No. PCT/IB2019/000559, 5 pages.
International Searching Authority, "Written Opinion," dated Feb. 3, 2020 in connection with International Patent Application No. PCT/IB2019/000559, 7 pages.

* cited by examiner

*Primary Examiner* — David Z Huang
(74) *Attorney, Agent, or Firm* — Hanley, Flight & Zimmerman, LLC (57) ABSTRACT

Methods, apparatus, systems and articles of manufacture are disclosed for leak detection from a thief hatch. An example thief hatch includes a vent control stem coupled to first and second sealing plates, the first and second sealing plates to control fluid flow through the thief hatch based on translation of the vent control stem, and an indicator extending from the vent control stem to provide a visual indication of a condition of the fluid flow.

18 Claims, 7 Drawing Sheets

METHODS AND APPARATUS FOR LEAK DETECTION FROM A THIEF HATCH

RELATED APPLICATION

This patent arises as a continuation of International Patent Application No. PCT/IB2019/000559, titled "METHODS AND APPARATUS FOR LEAK DETECTION FROM A THIEF HATCH" and filed Apr. 25, 2019, which is hereby incorporated by reference in its entirety.

FIELD OF THE DISCLOSURE

This disclosure relates generally to valves and, more particularly, to methods and apparatus for leak detection from a thief hatch.

BACKGROUND

Fluid tanks and/or pipes included in a fluid processing system may implement a thief hatch to allow pressure and vacuum venting of a tank and/or pipe, and allow an operator working with the fluid processing system to manually recover a sample of or determine a level of fluid stored in the tank and/or pipe coupled to the thief hatch.

In recent years, emission standards and regulations have driven a need for tighter sealing of pressure and vacuum venting portions of thief hatches. Additionally, this has increased the importance of differentiation between undesired leakage and normal venting of thief hatches, where undesired leakage is associated with fluid flow through a thief hatch when both the pressure and venting vacuum venting portions of the thief hatch are sealed.

SUMMARY

An example thief hatch includes a vent control stem coupled to first and second sealing plates, the first and second sealing plates to control fluid flow through the thief hatch based on translation of the vent control stem, and an indicator extending from the vent control stem to provide a visual indication of a condition of the fluid flow.

An example thief hatch leak analyzer apparatus includes a thief hatch position analyzer to determine an expected flow of a fluid through a thief hatch based on a state of the thief hatch, a leak determiner to compare a measured flow of the fluid through the thief hatch to the expected flow of the fluid, and an alert generator to generate an alert when a difference between the measured flow and the expected flow satisfies a threshold.

An example method includes determining an expected flow of a fluid through a thief hatch based on a state of the thief hatch, comparing a measured flow of the fluid through the thief hatch to the expected flow of the fluid, and generating an alert when a difference between the measured flow and the expected flow satisfies a threshold.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. Its reality, the boundaries and/or lines may be unobservable, blended, and/or irregular.

DETAILED DESCRIPTION

Thief hatches are, in some examples, included in fluid tanks and/or pipes in a fluid processing system to allow pressure and vacuum venting of the tank and/or pipe and to allow an operator working in the fluid processing system to manually recover a sample of or determine a level of the fluid stored in the tank and/or pipe to which the thief hatch is coupled.

Emissions standards and regulations have driven a need for tighter sealing of the pressure and vacuum venting portions of thief hatches as well as increased the importance of differentiation between undesired leakage and normal venting of the thief hatches. In some examples, undesired leakage is associated with a fluid flow through a thief hatch when both the pressure venting and vacuum venting portions of the thief hatch are sealed.

Conventional thief hatches allow one or more operational states including at least pressure side venting of the thief hatch due to a pressure of the fluid contained in a tank and/or pipe associated with a thief hatch exceeding a threshold, vacuum side venting of the thief hatch associated with a pressure of the fluid contained in a tank and/or pipe associated with the thief hatch dropping below a threshold (in some examples, a negative pressure associated with a vacuum), and a closed and/or sealed operational state. However, due to failure and/or degradation of one or more components of the thief hatch, fluid contained in the tank and/or pipe may vent to atmosphere even when the thief hatch is closed and/or sealed. Such venting is considered undesired leakage of the thief hatch. To differentiate between normal venting and undesired leakage of a thief hatch, methods and apparatus to detect an operational state of the thief hatch are needed.

Examples disclosed herein include operatively coupling an indicator (e.g., a first stem) that extends from the example thief hatch to a vent control stem (e.g., a second stem) included in the thief hatch. In operation, the indicator translates in tandem with the vent control stem. The position of the vent control stem and, thus, the indicator corresponds to the one or more operational states of the thief hatch. As a result, the indicator enables a human operator to visually determine an operational state of the thief hatch.

In some examples, a computer based system detects a leak of the example thief hatch based on a comparison of a position of the indicator measured by a proximity sensor and a fluid flow characteristic of the thief hatch determined based on one or more sensors (e.g., one or more pressure transducers, an IR camera, etc.).

Figures 1A, 1B:
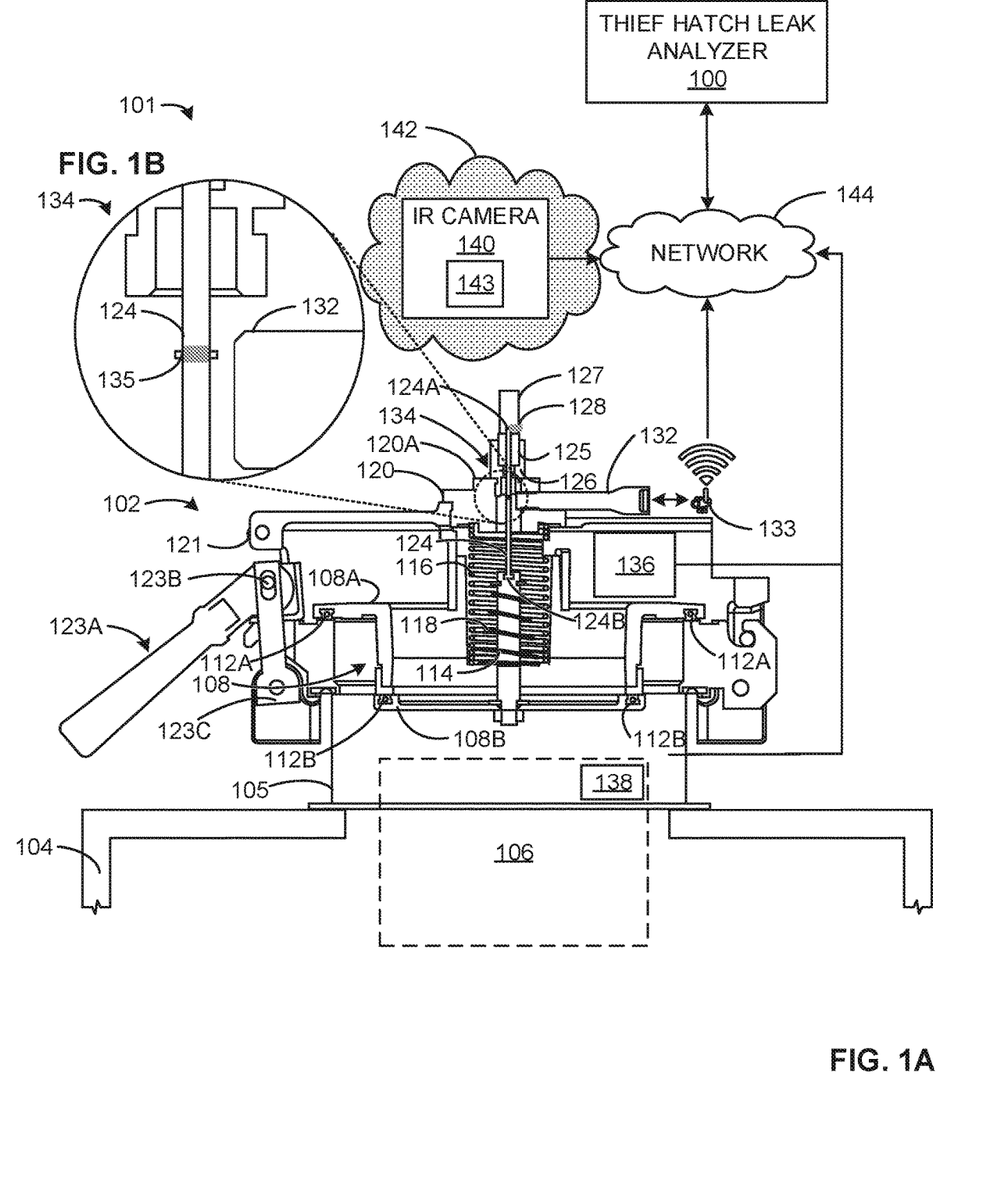
FIG. 1A is an illustration of an example environment of use for a thief hatch in communication with an example thief hatch leak analyzer constructed in accordance with teachings of this disclosure.
FIG. 1B is an illustration of an example stem included in the example thief hatch of FIG. 1A constructed in accordance with teachings of this disclosure.

Turning to the figures, FIG. 1A illustrates an example thief hatch leak analyzer 100 operating in an example environment of use 101. As illustrated in FIG. 1, the example environment of use 101 further includes an example thief hatch 102 capable of at least one of pressure and vacuum venting of an example tank 104 coupled to a base 105 of the thief hatch 102. In some examples, the tank 104 is fastened (e.g., bolted) to the base 105 of the thief hatch 102. In the illustrated example, the tank 104 contains an example fluid 106 of variable pressure and the thief hatch 102 controls venting of the fluid 106. The fluid 106 can also disposed within the base 105 of the thief hatch 102, as shown in the illustrated example of FIG. 1A.

To control the venting of the fluid 106, the thief hatch 102 further includes example sealing plates 108 (such as an example first sealing plate 108A and an example second sealing plate 108B) that can, in some examples, translate along one axis (e.g., a substantially vertical axis in the orientation of FIG. 1A) with respect to the thief hatch 102, wherein each of the sealing plates 108A-B includes a respective gasket 112A-B composed of a compliant material at respective material interfaces. For example, the gasket 112A in contact with the first sealing plate 108A contacts a portion of the tank 104 and, thus, creates a seal between the sealing plate 108A and the tank 104. Similarly, the gasket 112B in contact with the second sealing plate 108B contacts a portion of the first sealing plate 108A and creates a seal between the sealing plates 108A and 108B.

In some examples, when the gasket 112A contacts the tank 104 and the gasket 112B contacts the first sealing plate 108A, the thief hatch 102 is sealed and no fluid flow is allowed into (e.g., fluid ingress) and/or out of (e.g., fluid egress) the tank 104. In other examples, when the thief hatch 102 is sealed (e.g., each of the gaskets 112 is in contact with respective sealing surfaces), an observed fluid flow into and/or out of the tank 104 may be associated with a leak condition of the thief hatch 102.

To ensure the sealing plates 108 can only translate along one axis with respect to the thief hatch 102, each of the first sealing plate 108A and the second sealing plate 108B is coupled to an example vent control stem 114 disposed in the thief hatch 102. In some examples, the first sealing plate 108A is slidably coupled to the vent control stem 114 such that the first sealing plate 108A can translate relative to a longitudinal axis of the vent control stem 114. The second sealing plate 1089 is rigidly coupled to the vent control stem 114 and, thus, no relative motion occurs between the second sealing plate 108B and the vent control stem 114.

Additionally, a first biasing element 116 (e.g., a first spring) and a second biasing element 118 (e.g., a second spring) are disposed about the vent control stem 114. The first biasing element 116, in some examples, is disposed between the first sealing plate 108A at a first end of the first biasing element 116 and an example thief hatch cap 120 at a second end of the first biasing element 116. The thief hatch cap 120 is coupled to an example thief hatch cover 121 and is fixed relative to the thief hatch 102.

In operation, compression and extension of the first biasing element 116 correlates to translation of the first sealing plate 108A relative to the thief hatch 102. For example, translation of the first sealing plate 108A downward (in the orientation of FIG. 1A) relative to a nominal position shown in FIG. 1A results in extension of the first biasing element 116 and translation of the first sealing plate 108A upward relative to the nominal position results in compression of the first biasing element 116. Thus, when a pressure of the fluid 106 in the tank 104 satisfies an upper threshold, the pressure causes upward translation of the first sealing plate 108A that compresses the first biasing element 116 and allows venting of the fluid 106. This operation is described further in conjunction with FIG. 3.

The second biasing element 118, in some examples, is rigidly coupled to the vent control stem 114 at a first end of the second biasing element 118 and contacts the first sealing plate 108A at a second end of the second biasing element 118. Due to the rigid coupling between the second sealing plate 108B and the vent control stem 114, compression and extension of the second biasing element 118 corresponds to a translation of the second sealing plate 108B relative to the first sealing plate 108A. For example, a downward (in the orientation of FIG. 1A) translation of the second sealing plate 108B relative to the first sealing plate 108A from a nominal position causes compression of the second biasing element 118. Thus, when a pressure of the fluid 106 in the tank 104 satisfies a lower threshold (in some examples, the pressure is negative relative to the exterior pressure and is associated with a vacuum condition), the pressure causes compression of the second biasing element 118 that is associated with a downward translation of the second sealing plate 108B relative to the first sealing plate 108A that allows venting of atmosphere into the tank 104. This operation is described further in conjunction with FIG. 3.

In other examples, when the pressure of the fluid 106 in the tank 104 does not satisfy either of the lower or upper thresholds, the first and second biasing elements 116, 118 are in nominal states (as illustrated in FIG. 1A). This results in the gaskets 112A-B contacting the tank 104 and the first sealing plate 108A, respectively, and sealing (e.g., closing) of the thief hatch 102. This operation is further described in conjunction with FIG. 3. In addition to or alternative to the pressure of the fluid 106 in the tank 104 actuating the first sealing plate 108A and the second sealing plate 108B, a latching mechanism 123 can be operated by at least one of a human operator and/or an actuator to cause the thief hatch 102 to enter at least one of the closed (e.g., sealed) state, the pressure side opening operational state, and/or the vacuum side opening operational state. The latching mechanism 123 of the illustrated example includes a handle 123A, a latch pin 123B, and a latch 123C. In the closed state, a hooked portion of the latch 123C is engaged with the thief hatch 102. To open the thief hatch 102, the handle 123A can be rotated (e.g., clockwise) about the latch pin 123B to disengage the latch 123C from the thief hatch 102. When the latch 123C has disengaged from the thief hatch 102, the thief hatch 102 can rotate to open the thief hatch 102 to atmosphere, thereby equalizing the pressure of the fluid 106 with atmospheric pressure and allowing access to the contents of the tank.

The thief hatch 102 of the illustrated example of FIG. 1A also includes an example indicator 124 (e.g., a stem, an extension, a pin, etc.). In some examples, the indicator 124 is rigidly coupled to the vent control stem 114. In other examples, the vent control stem 114 and the indicator 124 are a unitary body. In either case, a longitudinal axis of the indicator 124 is substantially (e.g., +/−3 degrees) aligned with the longitudinal axis of the vent control stem 114. Further, the indicator 124 translates together or in tandem with the vent control stem 114 as the thief hatch 102 transitions to the closed state, the pressure side opening operational state, and/or the vacuum side opening operational state. In some examples, the indicator 124 passes through and extends substantially (e.g., 0.5" or more) beyond an external surface 120A of the thief hatch cap 120 along the longitudinal direction of the indicator 124.

In some examples, the indicator 124 extends through a bushing 125 that is rigidly coupled to the thief hatch cap 120 by an example coupling 126. In some examples, the bushing 125 includes a cavity (e.g., a through hole, a longitudinal axis of which is substantially parallel (e.g., +/−3 degrees) to the longitudinal axis of the vent control stem 114) through which the indicator 124 passes. As such, the bushing 125 ensures the longitudinal axis of the indicator 124 remains substantially parallel to the longitudinal axis of the vent control stem 114.

The thief hatch 102 of the illustrated example of FIG. 1A also includes an example cover 127 composed of a transparent material coupled to one of the example bushing 125 or the coupling 126. Because the operational state of the thief hatch 102 is associated with the position of the vent control stem 114, the operational state can be determined based on viewing a location of the first end 124A of the indicator 124 through the cover 127.

Additionally, the cover 127 includes example indicia 128 (e.g., a mark, a line, etc.). In some examples, when the first end 124A of the indicator 124 is aligned with the indicia 128, the thief hatch 102 is in a closed and/or sealed state. Additionally, in such examples, the thief hatch 102 is in a pressure side opening operational state when the first end of the indicator 124 is located vertically above the indicia 128 and is in a vacuum side opening operational state when the first end of the indicator 124 is located vertically below the indicia 128. In other examples, the indicia 128 may be a plurality of graduated lines or other marks spaced equidistant from one another. In such examples, a specific position of the first sealing plate 108A and the second sealing plate 108B (e.g., in inches, millimeters, etc.) can be determined based upon which of the plurality of lines aligns with the first end 124A of the indicator 124.

The thief hatch 102 of the illustrated example of FIG. 1A also includes an example proximity sensor 132 capable of communicating with the example thief hatch leak analyzer 100 via an example network adapter 133. A detail view 134 of the interface between the indicator 124 and the proximity sensor 132 is illustrated in FIG. 1B. In some examples, the proximity sensor 132 detects a presence of a portion of the indicator 124 that is composed of a ferromagnetic material 135. In some examples, the proximity sensor 132 is an inductive proximity switch capable of detecting a presence of the ferromagnetic material 135 based on a magnetic flux induced by the ferromagnetic material 135. In such examples, an output of the proximity sensor 132 may be binary and can either be a logical "1" (e.g., the ferromagnetic material 135 is detected) or a logical "0" (e.g., the ferromagnetic material 135 is not detected). In other examples, the logical outputs (e.g., 1 and 0) of the proximity sensor 132 may be associated with different detection conditions.

In other examples, the proximity sensor 132 is an inductive proximity sensor that can detect the presence of the ferromagnetic material 135 and a position of the ferromagnetic material 135 based on a magnitude of the magnetic flux induced by the ferromagnetic material 135. In such examples, an output of the proximity sensor 132 may include a position of the indicator 124 relative to the proximity sensor 132. In yet other examples, the proximity sensor 132 may be a linear or rotary encoder capable of determining a position of the indicator 124. In an alternative example, the proximity sensor 132 may be replaced by a sensor with a mechanical linkage to the indicator 124 or vent control stem 114 to determine a position of the vent control stem 114.

The thief hatch 102 of the illustrated example of FIG. 1A also includes an example first pressure transducer 136 and an example second pressure transducer 138. The first pressure transducer 136, as illustrated in FIG. 1A, is external to the tank 104 and can determine an atmospheric pressure of the environment of use 101 in which the thief hatch 102 operates. The second pressure transducer 138, as illustrated in FIG. 1A, is exposed to the pressure within the tank 104 and can determine a pressure of the fluid 106 that is disposed in the tank 104. In some examples, outputs of the first pressure transducer 136 and the second pressure transducer 138 can be at least one of an analog electrical signal (e.g., a voltage, a current, etc.) or digital data.

Additionally, the illustrated example of FIG. 1A includes an example infrared (IR) camera 140 disposed exterior to the thief hatch 102, but within the environment of use 101. The IR camera 140 acquires one or more images (e.g., as digital image data) of the field of view of the IR camera 140. In some examples, based on the thief hatch 102 either leaking the fluid 106 or venting the fluid 106 to the atmosphere of the environment of use 101, the IR camera 140 may detect an example fluid 142 exterior to the thief hatch 102 (e.g., the fluid 142 corresponding to a portion of the fluid 106 that exited the thief hatch 102). In some examples, the IR camera 140 includes an example processor 143 to perform image processing techniques on captured image data to determine the presence of the fluid 142. In other examples, the IR camera 140 conveys captured image data to the example thief hatch leak analyzer 100 for further processing.

An example network 144 of the illustrated example of FIG. 1A is the Internet. However, the example network 144 may be implemented using any suitable wired and/or wireless network(s) including, for example, one or more data buses, one or more Local Area. Networks (LANs), one or more wireless LANs, one or more cellular networks, one or more private networks, one or more public networks, etc. The example network 144, in some examples, enables each of the proximity sensor 132 (and the corresponding network adapter 133), the first pressure transducer 136, the second pressure transducer 138, and the IR camera 140 to be in communication with the example thief hatch leak analyzer 100. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

Figure 2:
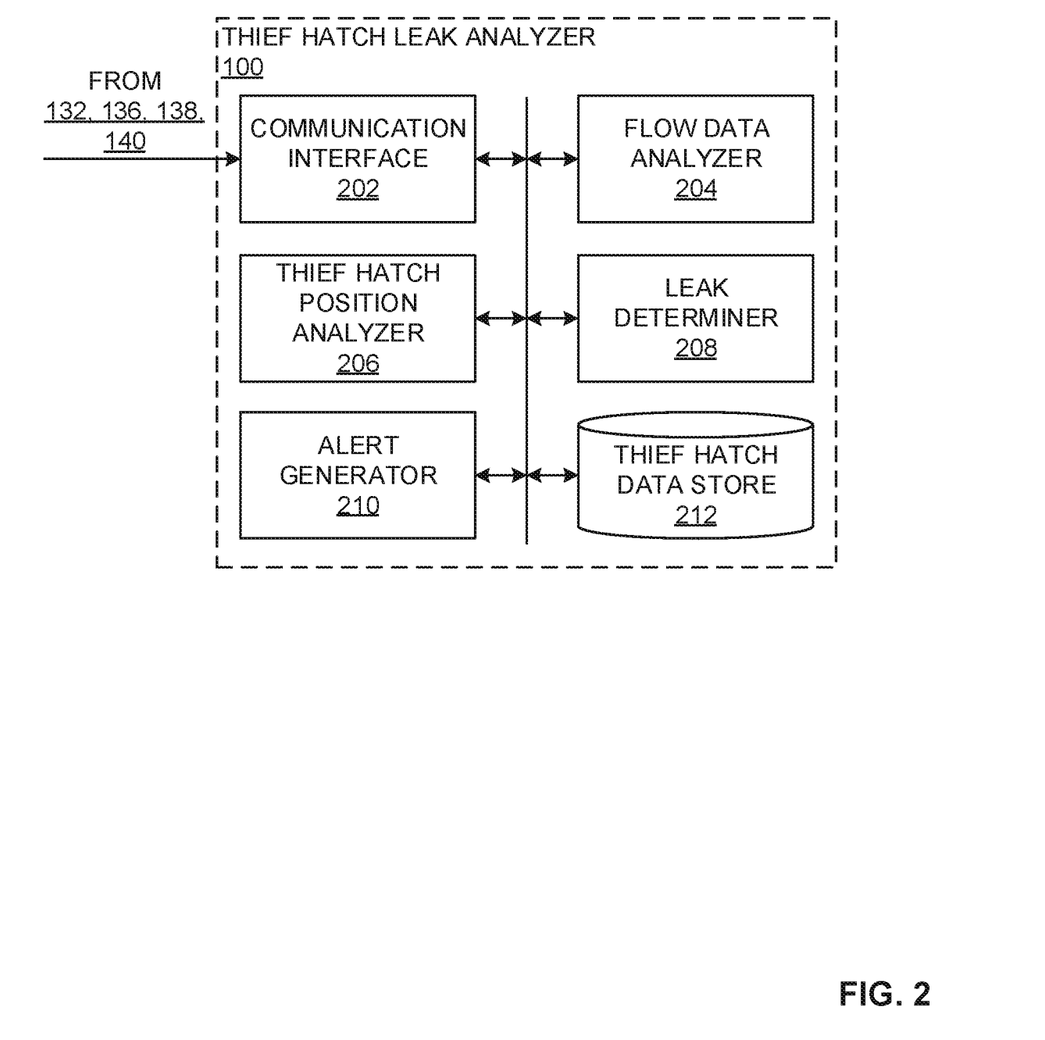
FIG. 2 is a block diagram of the example thief hatch leak analyzer of FIG. 1A to generate an alert in response to detection of a leak in the example thief hatch of FIG. 1A in accordance with teachings of this disclosure.

FIG. 2 is a block diagram of an example implementation of the example thief hatch leak analyzer 100 of FIG. 1A. In some examples, the thief hatch leak analyzer 100 can detect a leak of the example thief hatch 102 based on a comparison of a measured position of the indicator 124 and a fluid flow characteristic of the thief hatch 102 determined based on one or more sensors (e.g., the first pressure transducer 136, the second pressure transducer 138, the camera 140, etc.). The example thief hatch leak analyzer 100 includes at least one of an example communication interface 202, an example flow data analyzer 204, an example thief hatch position analyzer 206, an example leak determiner 208, an example alert generator 210, and an example thief hatch data store 212.

The example communication interface 202 of FIG. 2 is capable of receiving data from at least one of the sensors in the environment of use 101 (e.g., the example proximity sensor 132, the example first pressure transducer 136, the example second pressure transducer 138, and/or the example IR camera 140) via the example network 144. Additionally or alternatively, the example communication interface 202 distributes data received from the sensors in the environment of use 101 to at least one of the flow data analyzer 204, the thief hatch position analyzer 206, the leak determiner 208, the alert generator 210, and/or the thief hatch data store 212.

In some examples, the communication interface 202 can be implemented by any type of interface standards, such as an Ethernet interface (wired and/or wireless), a universal serial bus (USB), and/or a PCI express interface. Further, the interface standard of the example communication interface 202 is to at least one of match the interface of the network 144 or be converted to match the interface and/or standard of the network 144.

The example flow data analyzer 204 of FIG. 2 is capable of retrieving data, via the communication interface 202, from a sensor operating in the example environment of use 101. The sensor can, in some examples, include at least one of the first pressure transducer 136, the second pressure transducer 138, and/or the IR camera 140.

When the flow data analyzer 204 retrieves an image from the IR camera 140, the IR camera 140 is further to perform one or more vision analysis techniques on the image to determine whether the fluid 142 (e.g., corresponding to venting of the fluid 106) is present in the field of view of the IR camera 140.

In response to the example IR camera 140 detecting the example fluid 142 exterior to the example thief hatch 102, the flow data analyzer 204 determines that the fluid 106 is exiting the tank 104 through the thief hatch 102. Conversely, in response to the IR camera 140 not detecting the fluid 142 exterior to the thief hatch 102, the example flow data analyzer 204 determines that at least one of the thief hatch 102 is sealed or an atmospheric fluid is entering the tank 104 through the thief hatch 102.

In other examples, when the flow data analyzer 204 retrieves pressure data from at least one of the first pressure transducer 136 and the second pressure transducer 138, the flow data analyzer 204 calculates a difference between the tank pressure and the atmospheric pressure (e.g., the atmospheric pressure subtracted from the tank pressure, the tank pressure subtracted from the atmospheric pressure, etc.).

In some examples, the flow data analyzer 204 compares the calculated difference to a threshold. In response to the difference between the atmospheric pressure and the tank pressure satisfying a threshold, the example flow data analyzer 204 determines that the fluid 106 may be exiting the tank 104 through the thief hatch 102. Conversely, in response to the difference between the atmospheric pressure and the tank pressure not satisfying a threshold, the flow data analyzer 204 determines that at least one of the thief hatch 102 may be sealed or an atmospheric fluid may be entering the tank 104 through the thief hatch 102.

The thief hatch position analyzer 206 of FIG. 2 is capable of receiving a position of the indicator 124. In some examples, the received position of the indicator 124 can be one of a binary presence of the indicator 124 or a location of the indicator 124 received from the proximity sensor 132. In some examples, based on the position of the indicator 124, the thief hatch position analyzer 206 determines an expected fluid characteristic (in some examples, a flow characteristic) of the fluid 106. In some examples, in response to determining the thief hatch 102 is in one of a pressure or vacuum side opening operational state, the thief hatch position analyzer 206 determines that fluid flow into or out of the thief hatch 102 is expected. Conversely, in response to determining the thief hatch 102 is closed or sealed, the thief hatch position analyzer 206 determines that no fluid flow is expected into and/or out of the example thief hatch 102.

The leak determiner 208 of FIG. 2 is capable of calculating a difference between the expected fluid characteristic and the actual (e.g., measured) fluid characteristic. In some examples, when the expected fluid characteristic and the actual fluid characteristics are binary values (e.g., no fluid flow, fluid flow is present, etc.), the calculated difference is, similarly, a binary value. In other examples, when the expected fluid characteristic and the actual fluid characteristic are analog values (e.g., including a quantity of fluid and/or rate of fluid flow), the calculated difference includes a difference in one of a quantity of fluid and/or a rate of fluid flow. In either example, the leak determiner 208 compares the difference to a threshold and distributes a notification denoting a satisfaction status of the threshold to the example alert generator 210. In some examples, the threshold not being satisfied may be associated with a leak condition of the example thief hatch 102.

The example alert generator 210 of FIG. 2 is capable of generating an audible and/or visual alert (e.g., the alert associated with a leak of the thief hatch 102 determined based on the difference satisfying a threshold) or suspending a fluid operation associated with the thief hatch 102 (e.g., by closing an upstream valve, sealing the thief hatch 102, etc.) until a time at which the leak condition is corrected.

The thief hatch data store 212 of FIG. 2 is capable of storing at least one of historical fluid flow characteristics associated with the thief hatch 102, one or more characteristics of the example fluid 106, one or more thresholds, and a leak determination model, etc. The thief hatch data store 212 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The thief hatch data store 212 may additionally or alternatively be implemented by one or more double data rate (DDR) memories, such as DDR, DDR2, DDR3, mobile DDR (mDDR), etc. The thief hatch data store 212 may additionally or alternatively be implemented by one or more mass storage devices such as hard disk drive(s), compact disk drive(s), digital versatile disk drive(s), etc. While the illustrated example of FIG. 1A illustrates the thief hatch data store 212 as a single database, the thief hatch data store 212 may be implemented by any number and/or type(s) of databases. Further, the thief hatch data store 212 may be located in the thief hatch leak analyzer 100 or at a central location outside of the thief hatch leak analyzer 100. Furthermore, the data stored in the thief hatch data store 212 may be in any data format such as, for example, binary data, comma delimited data, tab delimited data, structured query language (SQL) structures, etc.

While an example manner of implementing the thief hatch leak analyzer 100 of FIG. 1A is illustrated in FIG. 2, one or more of the elements, processes and/or devices illustrated in FIG. 2 may be combined, divided, re-arranged, omitted, eliminated and/or implemented in any other way. Further, the example communication interface 202, the example flow data analyzer 204, the example thief hatch position analyzer 206, the example leak determiner 208, the example alert generator 210 and/or, more generally, the example thief hatch leak analyzer 100 of FIG. 2 may be implemented by hardware, software, firmware and/or any combination of hardware, software and/or firmware. Thus, for example, any of the example communication interface 202, the example flow data analyzer 204, the example thief hatch position analyzer 206, the example leak determiner 208, the example alert generator 210 and/or, more generally, the example thief hatch leak analyzer 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 202, the example flow data analyzer 204 the example thief hatch position analyzer 206, the example leak determiner 208, and/or the example alert generator 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example thief hatch leak analyzer 100 of FIG. 1A may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
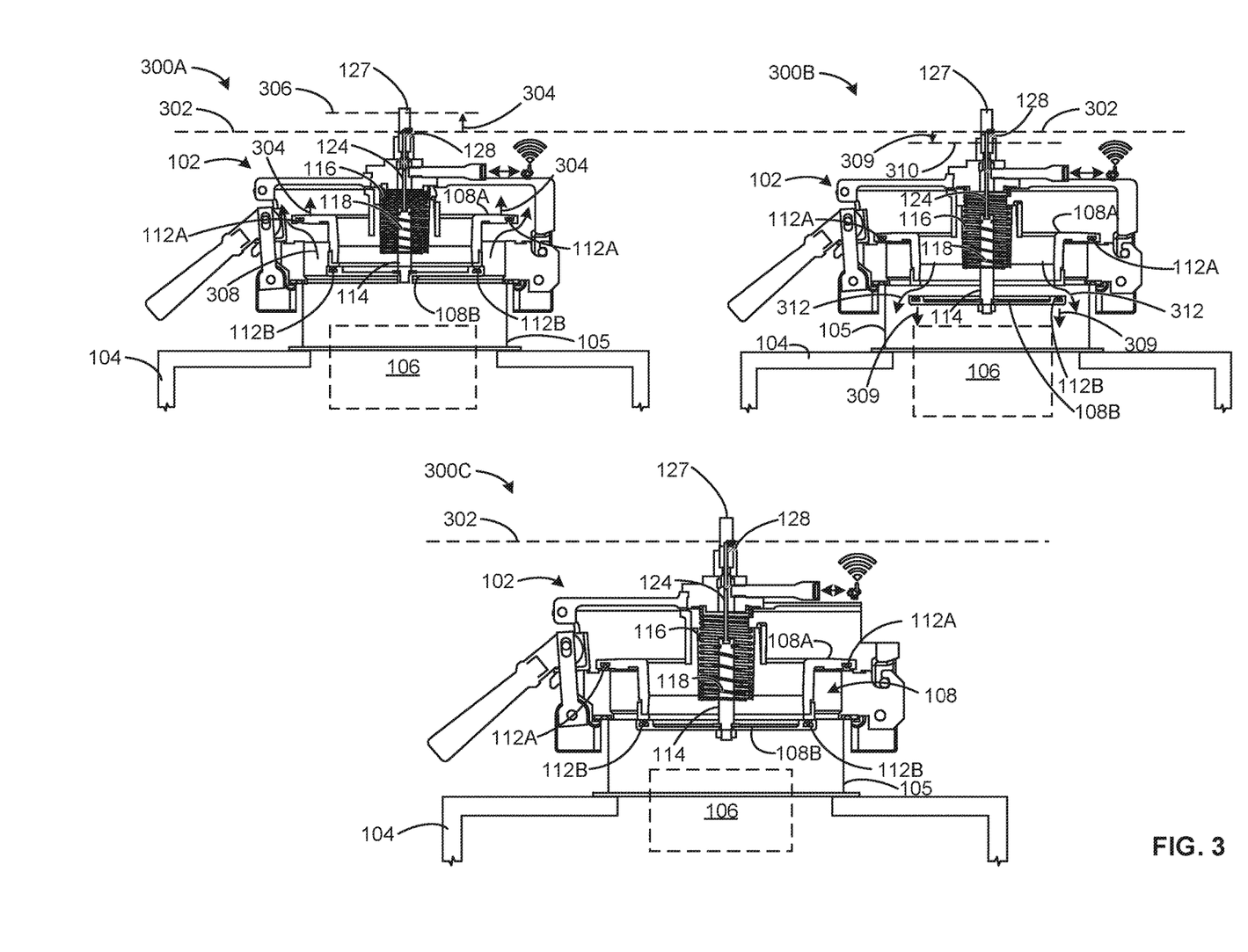
FIG. 3 is an illustration of example operational states of the example thief hatch of FIG. 1A including a pressure side opening state, a vacuum side opening state, and a closed state.

FIG. 3 illustrates example operational states of the example thief hatch 102 of FIG. 1A including a pressure side opening operational state 300A, a vacuum side opening operational state 300B, and a closed operational state 300C. In the illustrated example, a first position 302 (e.g., a nominal position) of the indicator 124 is associated with a closed and/or sealed state of the example thief hatch 102.

Turning to the operational state 300A illustrates a pressure side opening associated with a first vertical movement 304 of the first sealing plate 108A is due to a pressure in the tank 104 exceeding an atmospheric pressure by a threshold (e.g., the pressure difference causing compression of the first biasing element 116). The first vertical movement 304 of the first sealing plate 108A causes a corresponding first vertical movement 304 of the indicator 124 to an example second position 306. The movement of the first sealing plate 108A allows the fluid 106 in the tank 104 to vent through the thief hatch 102 along one or more vent paths 308 (e.g., vent paths, egress paths, etc.).

Operational state 300B illustrates a vacuum side opening associated with a second vertical movement 309 of the second sealing plate 108B due to an atmospheric pressure exceeding a tank pressure by a threshold (e.g., the difference causing extension of the second biasing element 118). In some examples associated with the vacuum side opening, the tank 104 is in a vacuum state and the pressure in the tank 104 is negative relative to atmospheric pressure. The second vertical movement 309 of the second sealing plate 108B causes the corresponding second vertical movement 309 of the indicator 124 to an example third position 310. The movement of the second sealing plate 108B allows an atmospheric fluid to enter the tank 104 through the thief hatch 102 along one or more ingress paths 312.

Operational state 300C illustrates a closed state of the thief hatch 102. In such examples, the indicator 124 is located in the first position 302 (e.g., a nominal position) that is further associated with the closed and/or sealed state of the example thief hatch 102. In some examples, when the thief hatch 102 is in the operational state 300C, a fluid flow (e.g., an undesired fluid flow through the thief hatch 102) may be present. In such examples, undesired fluid flow may be associated with a leak through the thief hatch 102.

Figure 4:
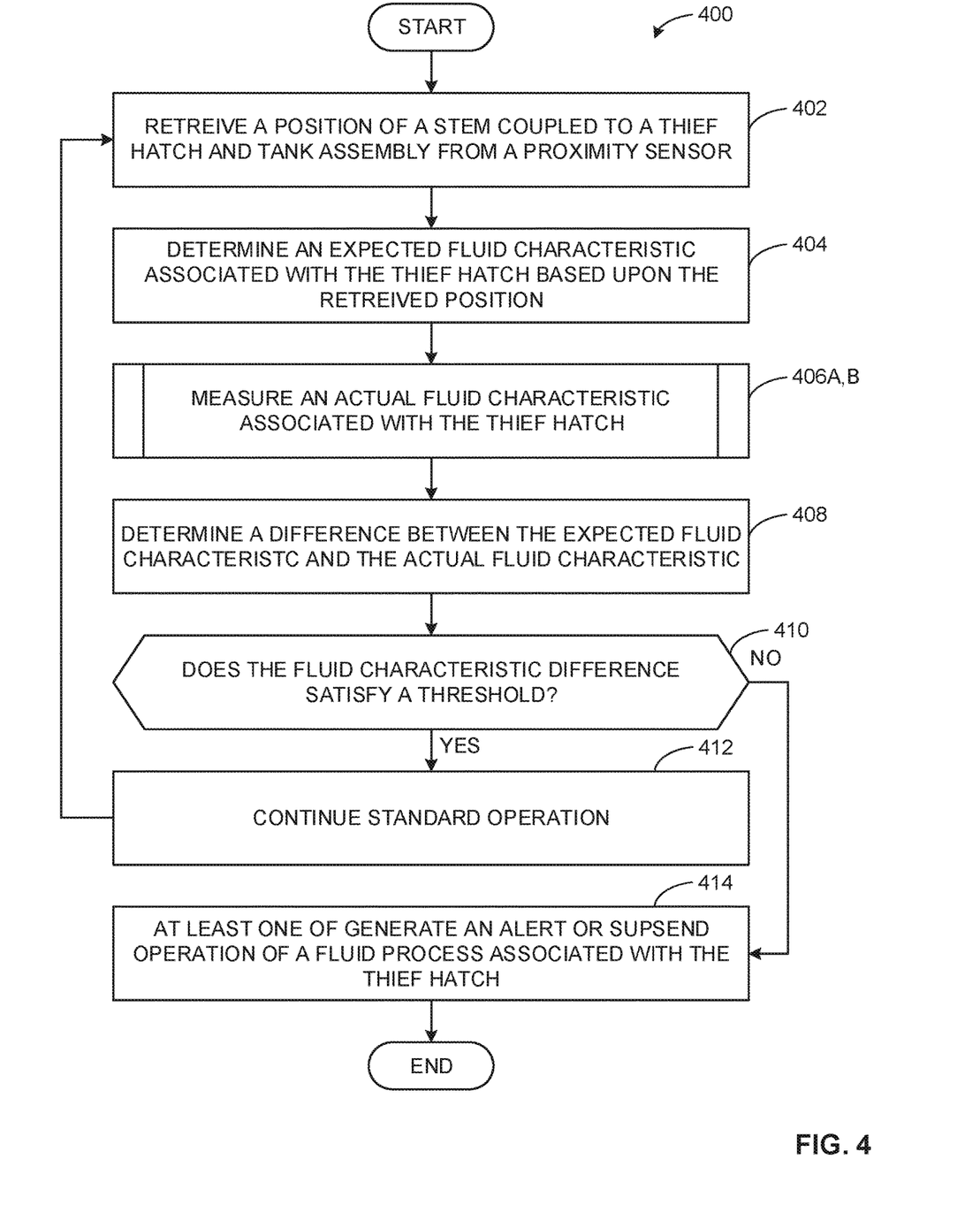
FIGS. 4-6 are flowcharts representative of example machine readable instructions that may be executed to implement the example thief hatch leak analyzer of FIGS. 1A and/or 2.
Figure 5:
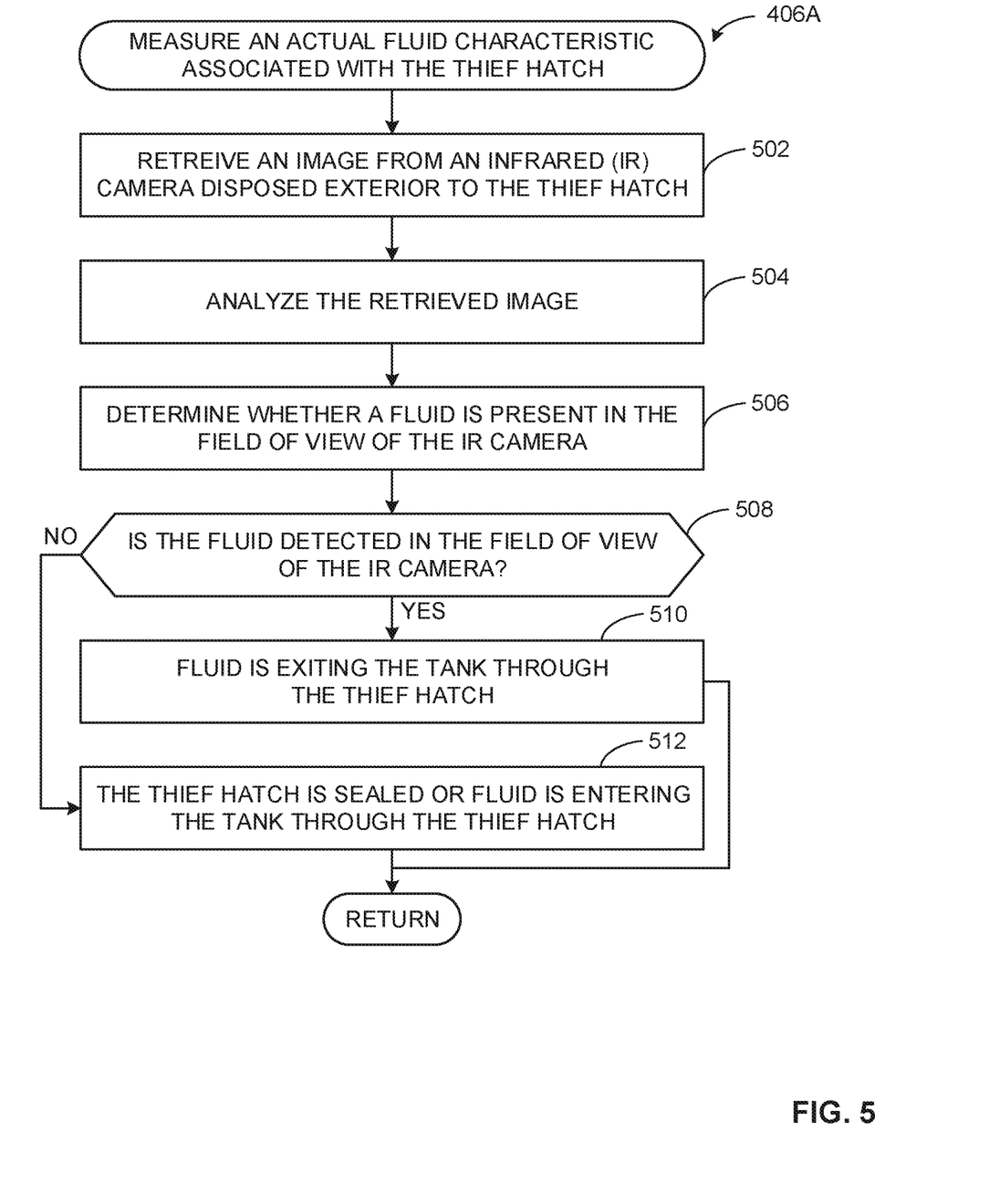
Figure 6:
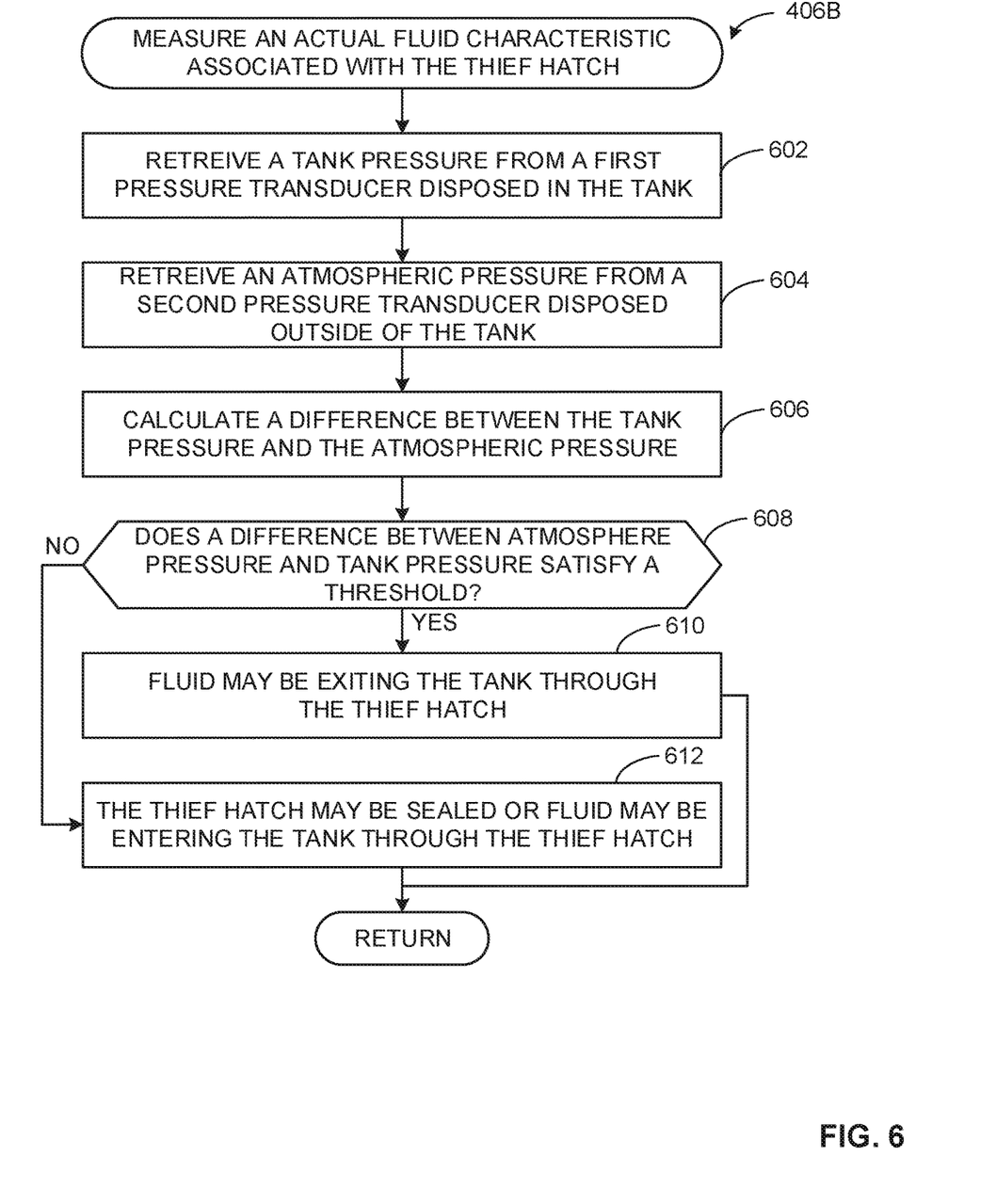

Flowcharts representative of example hardware logic, machine readable instructions, hardware implemented state machines, and/or any combination thereof for implementing the example thief hatch leak analyzer 100 of FIGS. 1 and 2 is shown in FIGS. 4-6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4-6, many other methods of implementing the example thief hatch leak analyzer 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A. (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example method 400 of FIG. 4 begins at block 402. At block 402, the communication interface 202 retrieves a position associated with the vent control stem 114. In some examples, the position is retrieved from the proximity sensor 132 that is in communication with the thief hatch leak analyzer 100 via the example network adapter 133.

In some examples, the proximity sensor 132 detects a binary presence of the ferromagnetic material 135. In such examples, the communication interface 202 retrieves a notification (e.g., a bit, a signal, etc.) that the example thief hatch 102 is either in one of a pressure or vacuum side venting operational state (e.g., one of the example operational states 300A, 300B) or that the thief hatch 102 is closed or sealed (e.g., the example operational state 300C). In other examples, the proximity sensor 132 detects an analog position of the ferromagnetic material 135 (e.g., a distance between the ferromagnetic material 135 and the proximity sensor 132) based on a magnetic field associated with the ferromagnetic material 135. In yet other examples, the proximity sensor 132 may be an encoder capable of determining incremental translation of the indicator 124. In each case, the communication interface 202 communicates the position of the indicator 124 to the thief hatch position analyzer 206.

At block 404, in response to receiving the position of the indicator 124, the thief hatch position analyzer 206 determines an expected fluid characteristic (in some examples, a flow characteristic) of the fluid 106 based on the position of the indicator 124. In some examples, in response to determining at block 402 that the thief hatch 102 is in one of a pressure or vacuum side venting operational state (e.g., one of the example operational states 300A, 300B), the thief hatch position analyzer 206 determines that fluid flow into or out of the thief hatch 102 is expected. Conversely, in response to determining at block 402 that the thief hatch 102 is closed or sealed (e.g., the example operational state 300C), the thief hatch position analyzer 206 determines that no fluid flow is expected into and/or out of the example thief hatch 102.

At block 406A,B, the flow data analyzer 204 utilizes at least one of the pressure transducers 136, 138 and/or the IR camera 140 to determine an actual (e.g., measured) fluid characteristic associated with the example thief hatch 102. Block 406A is further described in conjunction with FIG. 5 and block 406B is further described in conjunction with FIG. 6.

At block 408, the example leak determiner 208 calculates a difference between the expected fluid characteristic determined at block 404 and the actual (e.g., measured) fluid characteristic determined at one of block 406A or block 406B. In some examples, when the expected fluid characteristic and the actual fluid characteristics are binary values (e.g., no fluid flow, fluid flow is present, etc.), the calculated difference is, similarly, a binary value. In other examples, when the expected fluid characteristic and the actual fluid characteristic are analog values (e.g., including a quantity of fluid and/or rate of fluid flow), the calculated difference includes a difference in one of a quantity of fluid and/or a rate of fluid flow.

In either example, at block 410, the leak determiner 208 compares the difference calculated at block 408 to a threshold. In response to the difference satisfying the threshold, processing proceeds to block 412, at which the thief hatch 102 maintains standard operation and processing returns to block 402. Conversely, in response to the difference not satisfying the threshold, processing proceeds to block 414.

At block 414, in response to the difference exceeding a threshold as determined by the leak determiner 208, the alert generator 210 at least one of generates an audible and/or visual alert (e.g., the alert associated with a leak of the thief hatch 102 determined based on the difference exceeding a threshold) or suspends a fluid operation associated with the thief hatch 102 (e.g., by closing an upstream valve, etc.) until a time at which the leak condition is corrected. In response to at least one of generating an alert and/or suspending a fluid operation, the example method 400 of FIG. 4 ends.

An example method that may be executed to measure an actual fluid characteristic associated with the thief hatch 102 with the example IR camera 140 (FIG. 4, block 406A) is illustrated in FIG. 5. With reference to the preceding figures and associated descriptions, the example method of FIG. 5 begins execution at block 502 at which the communication interface 202 retrieves data associated with at least one image from the example IR camera 140 disposed exterior to the thief hatch 102. In some examples, the communication interface 202 distributes (e.g., conveys) data associated with the image to the example flow data analyzer 204.

At block 504, in response to receiving the image data from the communication interface 202, the flow data analyzer 204 performs one or more vision analysis techniques on the image data and, at block 506, determines whether the fluid 142 (e.g., corresponding to venting of the fluid 106) is present in the field of view of the IR camera 140 based on the one or more vision analysis techniques performed.

At block 508, in response to the IR camera 140 detecting the example fluid 142 exterior to the thief hatch 102, processing proceeds to block 510 at which the flow data analyzer 204 determines that the fluid 106 is exiting the tank 104 through the thief hatch 102. Conversely, in response to the IR camera 140 not detecting the fluid 142 exterior to the thief hatch 102, processing proceeds to block 512 at which the flow data analyzer 204 determines that at least one of the thief hatch 102 is sealed or an atmospheric fluid is entering the tank 104 through the thief hatch 102. In response to the completion of at least one of blocks 510 or 512, the example method 406A of FIG. 5 ends and processing returns to block 408 of the example method 400 of FIG. 4.

An example method that may be executed to measure an actual fluid characteristic associated with the thief hatch 102 using the example pressure transducers 136, 138 (FIG. 4, block 406B) is illustrated in FIG. 6. With reference to the preceding figures and associated descriptions, the example method of FIG. 6 begins execution at block 602 at which the example communication interface 202 retrieves a tank pressure from the first pressure transducer 136 and block 604 at which the communication interface 202 retrieves an atmospheric pressure from the second pressure transducer 138.

At block 606, utilizing the tank pressure retrieved at block 602 and the atmospheric pressure retrieved at block 604, the example flow data analyzer 204 calculates a difference between the tank pressure and the atmospheric pressure (e.g., the atmospheric pressure subtracted from the tank pressure, the tank pressure subtracted from the atmospheric pressure, etc.).

At block 608, the flow data analyzer 204 compares the difference calculated at block 606 to a threshold. In response to the difference between the atmospheric pressure and the pressure in the tank 104 satisfying a threshold, processing proceeds to block 610. Conversely, in response to the difference between the atmospheric pressure and the tank pressure not satisfying a threshold, processing proceeds to block 612.

At block 610, in response to the difference satisfying the threshold, the flow data analyzer 204 determines that the fluid 106 may be exiting the tank 104 through the thief hatch 102. Conversely, at block 612, in response to the difference not satisfying the threshold, the flow data analyzer 204 determines that at least one of the thief hatch 102 may be sealed or an atmospheric fluid may be entering the tank 104 through the thief hatch 102. In response to the completion of at least one of blocks 610 or 612, the example method 406B of FIG. 6 ends and processing returns to block 408 of the example method 400 of FIG. 4.

Figure 7:
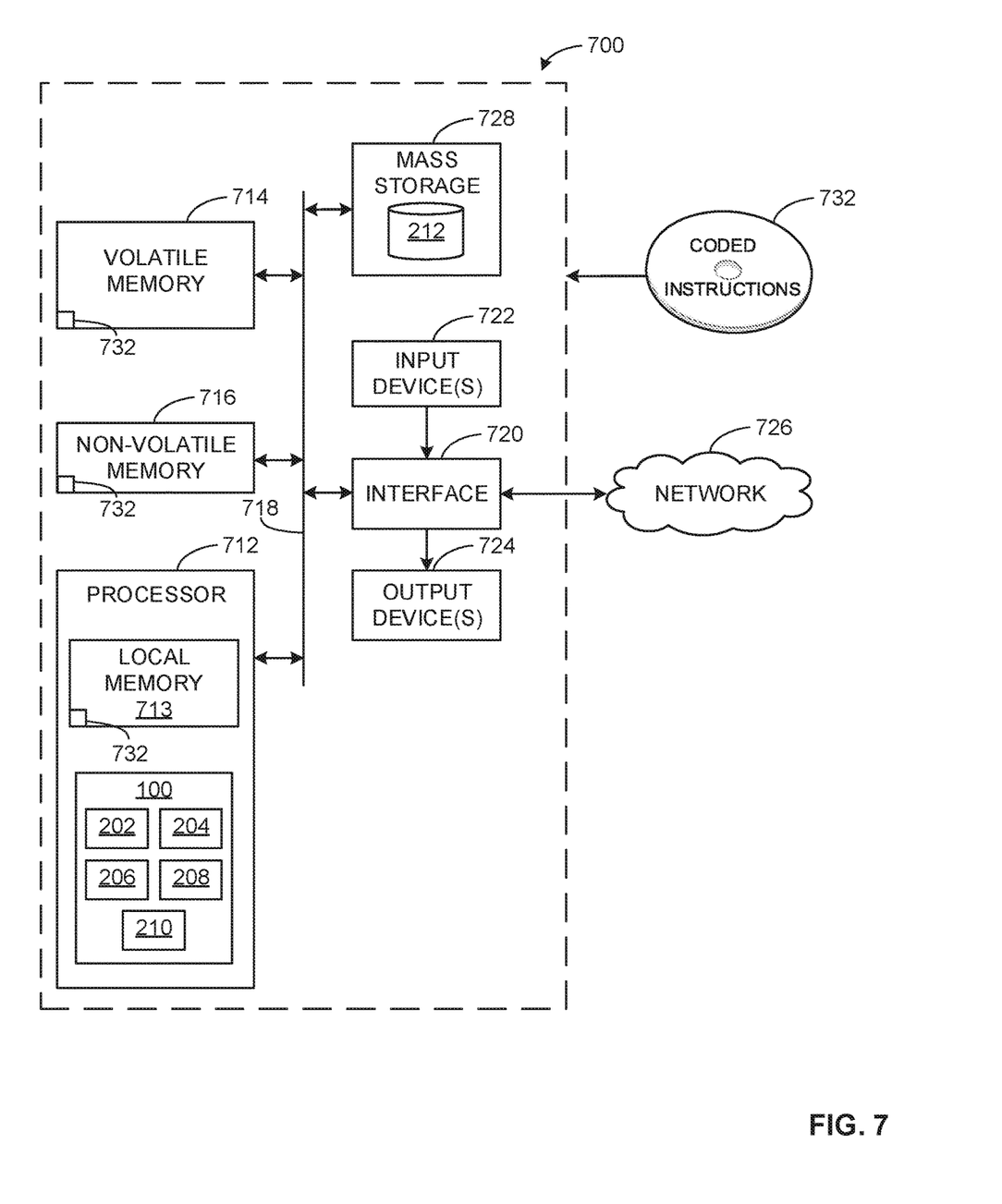
FIG. 7 is a block diagram of an example processing platform structured to execute the instructions of FIGS. 4-6 to implement the example thief hatch leak analyzer of FIGS. 1A and/or 2.

FIG. 7 is a block diagram of an example processor platform 700 structured to execute the instructions of FIGS. 4-6 to implement the example thief hatch leak analyzer 100 of FIG. 1A. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communication interface 202, the example flow data analyzer 204, the example thief hatch position analyzer 206, the example leak determiner 208, and the example alert generator 210.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that enable a human operator and/or a computer to detect undesired leakage of a thief hatch. Thus, the disclosed methods, apparatus and articles of manufacture aid in early detection of undesired leakage of thief hatches, decrease a quantity of fluid emitted from the thief hatch via undesired leakage, and improve the ability of thief hatches to abide by emissions standards and regulations set forth for fluid processing and storage systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A thief hatch, comprising:
a vent control stem coupled to first and second sealing plates, the first and second sealing plates to control fluid flow through the thief hatch based on translation of the vent control stem; and
an indicator extending from the vent control stem to provide a first visual indication of a condition of the fluid flow, wherein:
a first position of the indicator indicates fluid egress via the thief hatch;
a second position of the indicator indicates atmospheric ingress via the thief hatch; and
a third position of the indicator, located between the first position and the second position of the indicator, indicates the thief hatch is closed.

2. The thief hatch of claim 1, further including indicia adjacent to the indicator to provide a second visual indication of a position of the indicator.

3. The thief hatch of claim 1, wherein fluid egress or ingress via the thief hatch when the indicator is located in the third position is associated with leakage of the thief hatch.

4. The thief hatch of claim 1, wherein a portion of the indicator is composed of a ferromagnetic material, the thief hatch further including:
a proximity sensor to detect a position of the ferromagnetic material; and
a thief hatch leak analyzer communicatively coupled to the proximity sensor, the thief hatch leak analyzer to analyze the position of the ferromagnetic material.

5. The thief hatch of claim 4, further including an infrared (IR) camera communicatively coupled to the thief hatch leak analyzer to detect fluid egress via the thief hatch.

6. The thief hatch of claim 5, wherein the thief hatch leak analyzer is further configured to generate an alert when the IR camera detects fluid egress via the thief hatch and the proximity sensor detects the thief hatch is closed.

7. The thief hatch of claim 5, wherein the IR camera and the proximity sensor are communicatively coupled to the thief hatch leak analyzer via a wireless network.

8. The thief hatch of claim 4, further including:
a first pressure transducer disposed in a tank, the first pressure transducer to communicate a tank pressure to the thief hatch leak analyzer; and
a second pressure transducer disposed outside of the tank, the second pressure transducer to communicate an atmospheric pressure to the thief hatch leak analyzer.

9. The thief hatch of claim 8, wherein the thief hatch leak analyzer is further configured to generate an alert when the proximity sensor detects the thief hatch is closed and a difference between the tank pressure and the atmospheric pressure satisfies at least one of a first or second threshold.

10. An apparatus, comprising:
a tank including a fluid; and
a thief hatch coupled to the tank;
a vent control stem coupled to first and second sealing plates, the first and second sealing plates to control flow of the fluid through the thief hatch based on translation of the vent control stem;
an indicator extending from the vent control stem to provide a first visual indication of a condition of the flow;
a proximity sensor to detect a position of a portion of the indicator;
a thief hatch leak analyzer communicatively coupled to the proximity sensor; and
an infrared (IR) camera communicatively coupled to the thief hatch leak analyzer to detect fluid egress via the thief hatch.

11. The apparatus of claim 10, further including indicia adjacent to the indicator to provide a second visual indication of a position of the indicator.

12. The apparatus of claim 10, wherein:
a first position of the indicator indicates fluid egress via the thief hatch;
a second position of the indicator indicates atmospheric ingress via the thief hatch; and
a third position of the indicator, located between the first and second positions of the indicator, indicates the thief hatch is closed.

13. The apparatus of claim 12, wherein fluid egress or ingress via the thief hatch when the indicator is located in the third position is associated with leakage of the thief hatch.

14. The apparatus of claim 10, wherein the portion of the indicator is composed of a ferromagnetic material, the proximity sensor is to detect a position of the ferromagnetic material, and the thief hatch leak analyzer is to analyze the position of the ferromagnetic material.

15. The apparatus of claim 10, wherein the thief hatch leak analyzer is further configured to generate an alert when the IR camera detects fluid egress via the thief hatch and the proximity sensor detects the thief hatch is closed.

16. The apparatus of claim 10, wherein the IR camera and the proximity sensor are communicatively coupled to the thief hatch leak analyzer via a wireless network.

17. The apparatus of claim 10, further including:
a first pressure transducer disposed in the tank, the first pressure transducer to communicate a tank pressure to the thief hatch leak analyzer; and
a second pressure transducer disposed outside of the tank, the second pressure transducer to communicate an atmospheric pressure to the thief hatch leak analyzer.

18. The apparatus of claim 17, wherein the thief hatch leak analyzer is further configured to generate an alert when the proximity sensor detects the thief hatch is closed and a difference between the tank pressure and the atmospheric pressure satisfies at least one of a first or second threshold.

* * * * *